Patented Feb. 16, 1932

1,845,623

UNITED STATES PATENT OFFICE

HERMAN ALFRED PRAGER AND JOSEPH DEINET, OF MILWAUKEE, WISCONSIN, ASSIGNORS, BY MESNE ASSIGNMENTS, TO E. I. DU PONT DE NEMOURS & COMPANY, A CORPORATION OF DELAWARE

COLORS OF THE ANTHRACENE BLUE SERIES

No Drawing.     Application filed December 24, 1927. Serial No. 242,518.

This invention relates to a method of preparation of wool colors of the anthracene blue series.

Colors of this series belong in general to the class of polyhydroxyanthraquinones, either substituted, as by amino or sulfo groups, or unsubstituted. These colors, which are usually characterized by their excellent fastness to light have been heretofore largely prepared by subjecting a mono or dinitro anthraquinone to the combined action of oleum and sulphur, the oleum and sulphur having been previously mixed. As a result of the action of the oleum-sulphur mix, the nitro groups are reduced, ultimately to amino groups, and hydroxyl groups are introduced in place of hydrogen atoms in the anthraquinone ring. Under certain conditions the amino groups can be entirely replaced by hydroxyl groups, or sulfo groups can be introduced into the anthraquinone nucleus depending upon the conditions under which the reactions are performed.

We have now found that if a chloro nitro anthraquinone is used in place of an unsubstituted nitro anthraquinone, as the starting material, the resulting dyestuffs are of brighter and clearer shade than any of the known anthracene blues.

We have further found that by charging the sulphur into the oleum simultaneously with the nitro- or chloro-nitro anthraquinone, preferably as a mixture of sulphur and the nitro anthraquinone body, the quality of the resulting dyestuffs is also improved.

It is therefore an object of this invention to provide an economically practicable method for the preparation of dyes of the anthracene blue series having improved dyeing qualities.

Other and further important objects of this invention will be apparent from the disclosures in the specification and the appended claims.

Our preferred method comprises the addition of a chloro nitro anthraquinone, such as a dichloro nitro- or a dichloro-dinitro anthraquinone, together with sulfur to oleum, heating to 120 to 130° C., then cooling and diluting to effect hydrolysis. The sulfur may either be mixed with the anthraquinone body or added proportionately with the latter to the oleum.

Our invention also contemplates, however, certain variations from our preferred method. Instead of starting with a chloro nitro anthraquinone body, an unsubstituted nitro anthraquinone may be used as the starting material and mixed with sulfur prior to charging the mixture into oleum. In other words, certain advantages accrue from the procedure of first mixing the nitro anthraquinone body with the sulfur, rather than adding the sulfur first to the oleum, independent of whether a halogen substituted nitro anthraquinone is employed or not.

In view of the complicated reactions involved, it is very difficult to explain the reason for the beneficial results attributed by us to the procedure of adding the sulfur with the nitro anthraquinone body rather than to the oleum prior to charging in the nitro anthraquinone. In the latter case, it appears that the sulfur reacts with the oleum to produce a multiplicity of reducing agents, as evidenced by the progressive subsequent changes in the color of the solution, whereas in the former the reduction takes place simultaneously with the addition of the nitroanthraquinone and sulfur, the sulfur reacting with the oleum to produce a definite reducing agent and thus tending to drive the reaction in a single direction.

Furthermore, our invention relates more particularly to the first step in the production of anthracene blues, namely the simultaneous charging of the nitro anthraquinone body and sulfur into the oleum, and is largely independent of the subsequent steps, wherein the reduced nitro groups may be wholly replaced by hydroxyl groups or sulfo groups introduced. In general, however, the subsequent steps, which are herein referred to as hydrolysis steps, result in the saponification of the sulfuric acid esters formed during conversion.

Without limiting our invention to any particular procedure, the following examples, in which parts by weight are expressed, illustrates an embodiment of our preferred method:

*Example 1.*—3 parts of 1.8-dichloro-4.5-dinitro anthraquinone mixed with 1 part of flowers of sulfur are charged slowly at ordinary temperatures into 20 parts of 30 to 40% oleum, containing 1½ parts of boric acid. The mass is heated to 120° C. and a temperature of 120 to 130° C. maintained during 3 hours. It is then cooled and diluted to an 80% acid concentration to effect hydrolysis at 80° to 90° C. and discharged into water. When the reaction mass is diluted with water in this step, clouds of hydrogen chloride are given off. The coloring matter, which is water insoluble when the reaction is completed, is filtered off and dried. Chromed wool is dyed by this coloring matter a bright greenish blue of excellent fastness properties.

*Example 2.*—3 parts of 1-chloro-4.5-dinitro and 1-chloro-4.8-dinitro-anthraquinone mixture with 1 part of flowers of sulfur are charged into 20 parts of 30 to 40% oleum containing 1½ parts of boric acid. The remaining procedure is described in Example 1. The color is much redder than the one described in Example 1.

*Example 3.*—3 parts of a 1.6- and 1.7- dichloro-dinitro anthraquinone mixture with 1 part of flowers of sulfur are charged into 20 parts of 30 to 40% oleum containing 1½ parts of boric acid and treated as indicated in Examples 1 and 2. The resulting color is similar to the one obtained in Example 1.

We are aware that numerous details of the process may be varied through a wide range without departing from the principles of this invention, and we, therefore, do not purpose limiting the patent granted hereon otherwise than necessitated by the prior art.

We claim as our invention:

1. The process of preparing coloring matters of the anthracene blue series, which comprises subjecting a chloro-nitro anthraquinone body to the action of oleum and sulfur at an elevated temperature, cooling and diluting to effect hydrolysis.

2. The process of preparing coloring matters of the anthracene blue series, which comprises mixing a chloro-nitro anthraquinone body with sulfur, subsequently adding this mixture to oleum, heating to approximately between 120 and 130° C., cooling and diluting to effect hydrolysis.

3. The process of preparing coloring matters of the anthracene blue series, which comprises subjecting 1.8-dichloro-4.5-dinitro anthraquinone to the action of oleum and sulfur at an elevated temperature, cooling and diluting to effect hydrolysis.

4. The process of preparing coloring matters of the anthracene blue series, which comprises mixing 1.8-dichloro-4.5-dinitro anthraquinone with sulfur, subsequently adding this mixture to oleum, heating to approximately 120 to 130° C., cooling and diluting to effect hydrolysis.

5. The process of preparing coloring matters of the anthracene blue series, which comprises subjecting a chloro-nitro anthraquinone body to the action of oleum and sulfur in the presence of boric acid at a temperature of 120 to 130° C., cooling and diluting to effect hydrolysis at approximately 80 to 90° C.

6. The process of preparing coloring matters of the anthracene blue series, which comprises subjecting 1.8-dichloro-4.5-dinitro anthraquinone to the action of oleum and sulfur in the presence of boric acid at a temperature of 120° to 130° C., cooling and diluting to effect hydrolysis.

7. In the process of preparing coloring matters of the anthracene blue series, the step of adding a preformed mixture of a chloro-nitro-anthraquinone and sulfur to oleum at an elevated temperature.

8. In the process of preparing coloring matters of the anthracene blue series, the step of adding a chloro-nitro-anthraquinone simultaneously with a proportionate quantity of sulfur to oleum at an elevated temperature.

9. In the process of preparing coloring matters of the anthracene blue series by treating a chloro-nitro-anthraquinone body with sulphur and oleum at elevated temperatures, the step which comprises forming an intimate mixture of the chloro-nitro-anthraquinone body and the sulphur before adding them to the oleum.

10. As new articles of manufacture, coloring matters of the anthracene blue series obtainable by reacting at an elevated temperature with sulphur and oleum a chloro nitro anthraquinone body, cooling and diluting to effect hydrolysis.

11. As new articles of manufacture, coloring matters of the anthracene blue series obtainable by reacting at an elevated temperature with sulphur and oleum a nitro-anthraquinone body containing a chlorine atom in an alpha position, cooling and diluting to effect hydrolysis.

12. As new articles of manufacture, coloring matters of the anthracene blue series obtainable by reacting at an elevated temperature, with sulphur and oleum, 1.8-dichloro-4.5-dinitro-anthraquinone, cooling and diluting to effect hydrolysis.

In testimony whereof we have hereunto subscribed our names at Carrollville, Milwaukee County, Wisconsin.

HERMAN ALFRED PRAGER.
JOSEPH DEINET.